(12) United States Patent
Smith et al.

(10) Patent No.: US 8,274,422 B1
(45) Date of Patent: Sep. 25, 2012

(54) INTERACTIVE SYNTHETIC APERTURE RADAR PROCESSOR AND SYSTEM AND METHOD FOR GENERATING IMAGES

(75) Inventors: Brian Hendee Smith, Woodinville, WA (US); Daniel James Gleason, Seattle, WA (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 12/834,986

(22) Filed: Jul. 13, 2010

(51) Int. Cl.
*G01S 13/00* (2006.01)

(52) U.S. Cl. .................... 342/25 R; 342/25 A; 342/176; 342/190

(58) Field of Classification Search .................... 342/25
See application file for complete search history.

(56) References Cited

U.S. PATENT DOCUMENTS

| | | | | |
|---|---|---|---|---|
| 2005/0157931 | A1* | 7/2005 | Delashmit et al. | 382/190 |
| 2008/0063237 | A1* | 3/2008 | Rubenstein | 382/103 |
| 2008/0211816 | A1* | 9/2008 | Gonzalez et al. | 345/505 |
| 2009/0102705 | A1* | 4/2009 | Obermeyer | 342/25 F |
| 2010/0033367 | A1* | 2/2010 | Hellsten et al. | 342/25 A |

OTHER PUBLICATIONS

Lambers, Martin, et al., "GPU-based Framework for Interactive Visualization of SAR Data", Proc. Int. Geoscience and Remote Sensing Symposium (IGARSS), Jul. 2007.

\* cited by examiner

*Primary Examiner* — Timothy A Brainard
(74) *Attorney, Agent, or Firm* — Charles L. Moore; Moore & Van Allen PLLC

(57) ABSTRACT

A system for generating images may include an interactive SAR processor for generating an image using SAR data. The system may also include a module associated with the SAR processor for allowing a user to interactively select different settings for each of a group of parameters for generating different images by the interactive SAR processor using the SAR data.

23 Claims, 4 Drawing Sheets

INTERACTIVE SYNTHETIC APERTURE RADAR PROCESSOR AND SYSTEM AND METHOD FOR GENERATING IMAGES

BACKGROUND

Aspects of the present disclosure relate to generating images from data received using radar, and more particularly to an interactive synthetic aperture radar (SAR) processor and system, method and computer program product for generating images using SAR data and the interactive SAR processor.

Synthetic Aperture Radar (SAR) systems are capable of generating geospatial products or images from radio frequency (RF) energy. Typically, raw SAR data is collected from a radar system and processed into a pixel-valued geospatial product at a remote data center. This product may be a fairly simple representation of a radar cross section, or a more complicated product based on the phase information, such as an interferogram. These geospatial products are generated by running a set of algorithms with pre-defined parameters on the original SAR data. If an analyst would like to see the data processed in an alternative form, the analyst must have the data re-processed to form a new image. This may require a request to a remote data center, where the original data resides (if the data is still available), and transfer the resulting product to the analyst's workstation. Accordingly, current SAR systems do not permit an analyst to make adjustments to the processing parameters and to generate different products or images based on the adjustments to the parameters substantially instantaneously or in real-time.

BRIEF SUMMARY

According to one aspect of the present disclosure, a system for generating images may include an interactive SAR processor for generating an image using SAR data. The system may also include a module associated with the SAR processor for allowing a user to interactively select different settings for each of a group of parameters for generating different images by the interactive SAR processor using the SAR data.

According to another aspect of the present disclosure, a method for generating images may include receiving SAR data by an interactive SAR processor. The method may also include allowing a user to interactively select different settings for each of a group of parameters in a real-time feedback loop for generating different images using the SAR data. The method may also include generating an image by the interactive SAR processor from the SAR data based on the selected settings of the group of parameters. The method may additionally include displaying the image on a display.

According to another aspect of the present disclosure, a video card may include an interactive SAR processor for generating an image using SAR data based on selected values for a group of processing parameters. The video card may also include a memory on the video card with the interactive SAR processor to store the SAR data to substantially minimize a time delay in generating the image.

According to a further aspect of the present disclosure, a computer program product for generating images may include a readable storage medium having computer readable program code embodied therewith. The computer readable program code may include computer readable program code configured to allow a user to interactively select different settings for each of a group of parameters in a real-time feedback loop for generating different images using SAR data. The computer readable program code may also include computer readable program code configured to generate an image from the SAR data based on the selected settings of the group of parameters in a real-time feedback loop. The computer readable program code may additionally include computer readable program code configured to display the image.

BRIEF DESCRIPTION OF THE SEVERAL VIEWS OF THE DRAWINGS

The present disclosure is further described in the detailed description which follows in reference to the noted plurality of drawings by way of non-limiting examples of embodiments of the present disclosure in which like reference numerals represent similar parts throughout the several views of the drawings and wherein.

DETAILED DESCRIPTION

Figure 1:
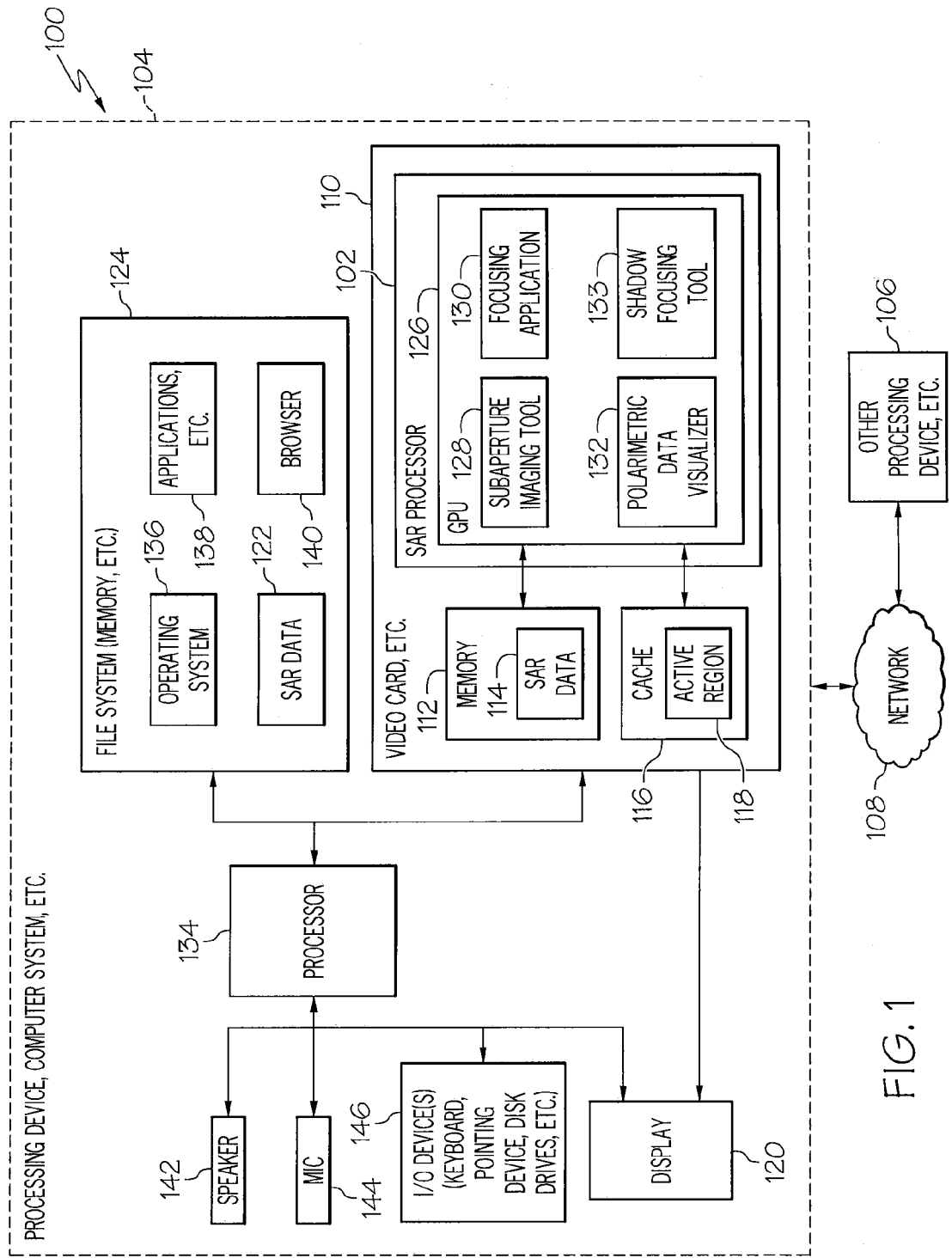
FIG. 1 is a block schematic diagram of an example of a system for generating images including a SAR processor in accordance with an embodiment of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block schematic diagram of an example of a system 100 for generating images including a SAR processor 102 in accordance with an embodiment of the present disclosure. The system 100 may include a processing device 104, computer system or other apparatus. The processing device 104 may also be a server which may be accessible by other processing devices 106, computer systems or servers via a network 108. The network 108 may be the Internet, an intranet or other private or proprietary network.

The SAR processor 102 may be an interactive SAR processor as described in more detail herein to provide a user or operator the ability to adjust processing parameters in a real-time feedback loop to substantially instantaneously generate new images using the SAR data based on the new parameter values applied to the SAR data.

The SAR processor 102 may be formed on or attached to a video card 110. An example of the video card may be an NVIDIA 280 GTX video card or similar video card. NVIDIA is a trademark of the NVIDIA Corporation in the United States, other countries or both. The video card 110 may also include a memory 112 for storing the raw SAR data 114. With the SAR processor 102 and the memory 112 storing the SAR data 114 both residing on the video card 110, a new image based on a new selected setting of a group of process parameters may be substantially immediately or instantaneously generated, or may be generated at least with substantially minimal time delay. Accordingly, the image processing parameters may effectively be adjusted in a real-time feedback loop to permit an operator or analyst to see a resulting new image substantially instantaneously and to iteratively or interactively make any additional adjustments to generate further images.

The SAR data 122 may be loaded from the file system 124 of the main system memory and cached. The SAR processor 102 may generate an image from the cached SAR data 114, which is stored in the memory 112 on the video card 110. The image may be rendered directly to a display 120 by the video card 110.

A module or mechanism as described in more detail herein may be provided in association with the SAR processor 102 for allowing a user to interactively select different settings for each of the group of parameters for generating different images by the interactive SAR processor 102 using the SAR data. The module or mechanism may generate a graphical user interface (GUI) similar to that described with reference to FIGS. 3 and 4 that may be presented to the operator or analyst for making adjustments to the group of parameters. In another embodiment adjustment knobs or similar features may be provided for making adjustments to the parameters.

Examples of the parameters that may be selected or adjusted for generating new images may include but is not necessarily limited to azimuth resolution, processing time offset, range resolution and range frequency offset. Additional parameters may be added for special algorithms, such as height of the focus plane, transmit and receive polarization, and or algorithm specific parameters.

The video card 110 may also include a cache 116 to cache an active region 118 or to cache SAR data for the image currently being displayed (active region) by the system 100. The cache 116 may be a separate component similar to that illustrated in FIG. 1 or may be part of the memory 112. In another embodiment only the cache 116 may be provided to store the active region data 118 and the video card may not have memory 112.

The complete image may actual be larger than that visible on a display, such as display 120 of the processing device 104 or computer system. Accordingly, the active region 118 may be shifted in response to the user scrolling around the image being displayed. The SAR data for the active region 118 in the cache 116 may be refreshed or changed from SAR data 122 stored on a main computer memory or file system 124 as the user scrolls or moves a computer pointing device around the displayed image. The changing data for the active region may occur in the background or in a background process on the SAR processor 102. Therefore, the changing image will appear to be substantially seamless to the user during scrolling.

The SAR processor 102 may include a graphical processing unit (GPU) 126 or a plurality of GPUs. For example, if the video card is an NVIDIA 280 GTX, this video card contains 240 GPU cores. Examples of tools or applications that may be operable on the SAR processor 102 or GPU 126 may include but is not necessarily limited to a subaperture imaging tool 128, a focusing application 130, a polarimetric data visualizer 132, or a shadow enhancement tool. The subaperture imaging tool 128 may permit a user or operator to interactively trade or switch between a spatial resolution and a temporal resolution. The operator can adjust the resolution of the image, electing to use only a portion of the synthetic aperture data to form the image, and select which portion of the data to contribute to the image. By adjusting which portion of the data contributes to the image, the operator can visualize temporal changes, such as mobbing objects. This may enable a direct ability to explore the time-frequency content of the SAR data. An example of exploring the time-frequency content of SAR data is described in "Subaperture Analysis of High Resolution Polarimetric SAR Data", by T. L. Ainsworth, R. W. Jansen, J. S. Lee and R. Fiedler, *Proc. IGARSS* 1999, Vol. 1, pp. 41-43, 1999.

The focusing application 130 may permit a user or operator to adjust the focus objects in complex SAR data. This may enable the user to focus up moving objects, remove atmospheric distortions, or correct for height-of-focus induced blurring.

The polarimetric visualizer 132 may permit synthesis of arbitrary polarization combinations from polarimetric SAR data. A shadow focusing application 133 or shadow enhancement tool allows the operator to select a region of the image, and optimize processing parameters to highlight shadows from vertical obstructions. An example of enhancing target shadows that may be used is described in "Enhancing Target Shadows in SAR Images," by T. Span et al., *Electronics Letters* 1$^{st}$, March 2007, Vol. 43 No. 5.

The computer system 104 may include a processor 134 to control operation of the computer system 104 and the video card 110. As previously described, the computer system 104 may also include a file system 124, memory or similar data storage device in communication with the processor 134 and the video card 110. An operating system 136, applications 138 and other programs may be stored on the file system 124 for running or operating on the processor 134. A web or Internet browser 140 may also be stored on the file system 124 for accessing other resources online via the network 108.

As previously discussed, the raw SAR data 122 may also be stored on the file system 124 or memory of the main computer system 104. The SAR data 122 may be provided or transferred to the video card 110 as needed to perform the functions described herein. The SAR data 114 on the video card 110 may be substantially the same as the SAR data 122 on the computer file system 124 or memory, or the SAR data 114 may only be a portion or subset of the SAR data 122 currently needed for processing any images by the SAR processor 102.

The computer system 104 may also include a display 120, as previously discussed, for presenting or displaying the images generated by the SAR processor 102 using the SAR data 114. The computer system 104 may also include a speaker system 142 for receiving and presenting audio content. The computer system 104 may additionally include a microphone 144 for the user or operator to provide voice commands and to communicate via the computer system 104.

The computer system 104 may further include one or more input devices, output devices or combination input/output devices, collectively I/O devices 146. The I/O devices 146 may include a keyboard, pointing device, such as a mouse or other computer pointing device, disk drives and any other devices to permit a user to interface with and control operation of the computer system 104 and to go online and access other online resources, such as other processing device 106.

Figure 2:
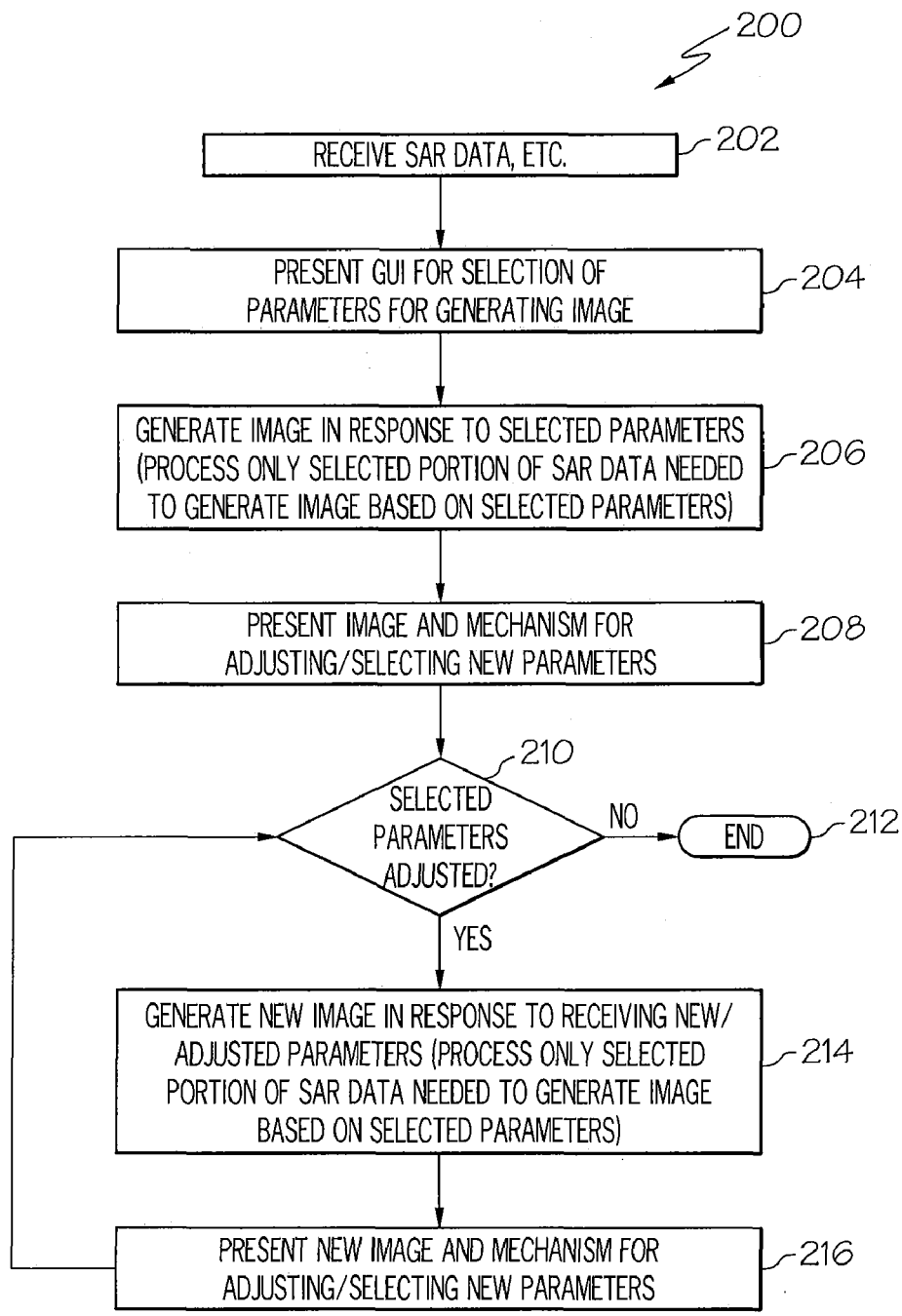
FIG. 2 is an example of a flow chart for generating images using SAR data on a SAR processor in accordance with an embodiment of the disclosure.

FIG. 2 is an example of a flow chart of a method 200 for generating images using SAR data on a SAR processor or similar apparatus in accordance with an embodiment of the disclosure. The method 200 may be embodied in and performed by the SAR processor 102 of FIG. 1. In block 202, SAR data may be received for processing. As previously discussed, the SAR data may be received by an interactive SAR processor or similar device.

In block 204, a feature, such as a GUI or other mechanism, may be presented to allow a user or operator to interactively select different settings for each of a group of parameters in a real-time feedback loop for generating different images using the SAR data.

In block 206, an image may be generated by the interactive SAR processor from the SAR data based on the selected settings of the group of parameters. Only a selected portion of the SAR data may be needed for processing to generate the image based on the selected parameters or parameter values.

In block 208, the image based on the selected settings of the group of parameters or based on the selected parameter values may be presented. A mechanism or GUI for adjusting or selecting new parameter values or new settings of the group of parameters may also be presented. An example of a mechanism for adjusting or selecting new parameters or parameter values will be described with reference to FIGS. 3 and 4.

In block 210, a determination may be made whether selected parameters have been adjusted or new values have been chosen for selected parameters. If none of the processing parameters have been adjusted, the method 200 may end at termination 212. If selected parameters have been adjusted in block 210, the method 200 may advance to block 214.

In block 214, a new image may be generated in response to receiving the new or adjusted parameter values. Only selected portions of the SAR data needed to generate the new image may be processed based on the selected parameters. As previously discussed, the SAR data may be stored in a memory on a video card with the interactive SAR processor for substantially immediately generating a new image by the interactive SAR processor in response to a new selected setting of the group of parameters.

In block 216, the new image based on the new selected parameter settings may be presented. Additionally, the feature or mechanism for adjusting or selecting new parameter values may also be presented. The method 200 may loop back to block 210 were a determination may be made again whether or not selected parameters have been adjusted or new settings of the group of parameters have been selected. The method 200 may then proceed similar to that previously described.

The resulting data from processing the SAR data to generate the new image may also be stored in a memory or cache on the video card similar to that previously described. The resulting data may be stored in association with the SAR processor on the video card to substantially minimize a time delay in generating further new images based on new selected settings of the group of parameters. Similar that previously discussed, and operator or analyst may iteratively or interactively adjust the parameter settings in a real-time feedback loop to progressively generate images for review and analysis.

Figure 3:
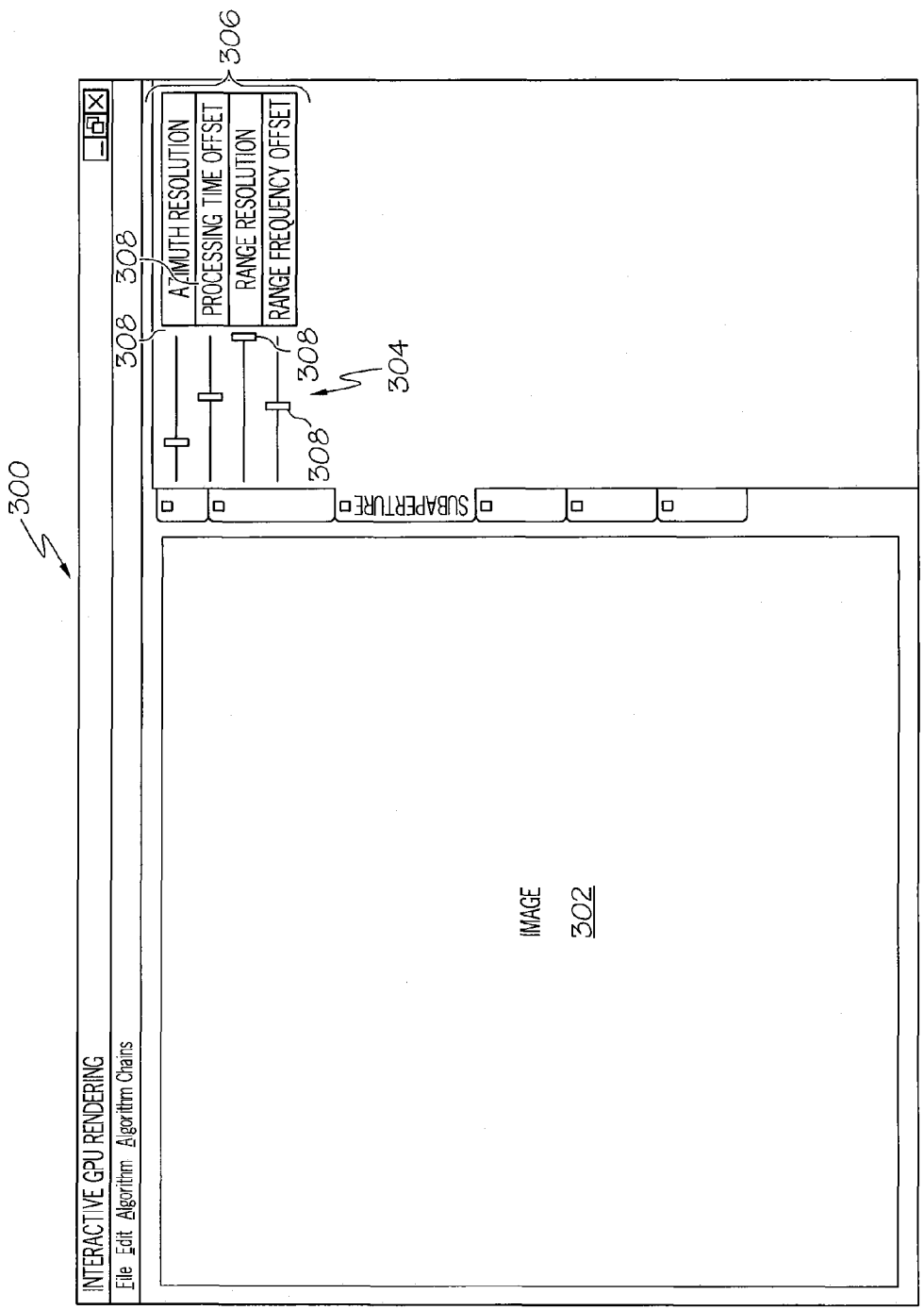
FIG. 3 is an example of a graphical user interface for processing images using SAR data on a SAR processor in accordance with an embodiment of the present disclosure.

FIG. 3 is an example of a GUI 300 for processing images using SAR data on a SAR processor in accordance with an embodiment of the present disclosure. The GUI 300 may include a section 302 for presenting or displaying the image based on the current settings for the group of parameters. The GUI 300 may also include a mechanism 304 or feature for selecting different settings of the group of parameters 306 for adjusting the parameters 306 in a real-time feedback loop for generating a new image based on the adjusted parameters. In the exemplary GUI 300 illustrated in FIG. 3, the group of parameters 306 may include but is not necessarily limited to azimuth resolution, azimuth offset, range resolution, and range offset 312. A slide feature 308 may be provided in association with each parameter 306. The slide feature 308 may be moved using a computer pointing device or the like to different values for each parameter 306. A new image may be generated and presented in response to selecting a new set of parameter values or adjusting the parameters using the slide 308.

Figure 4:
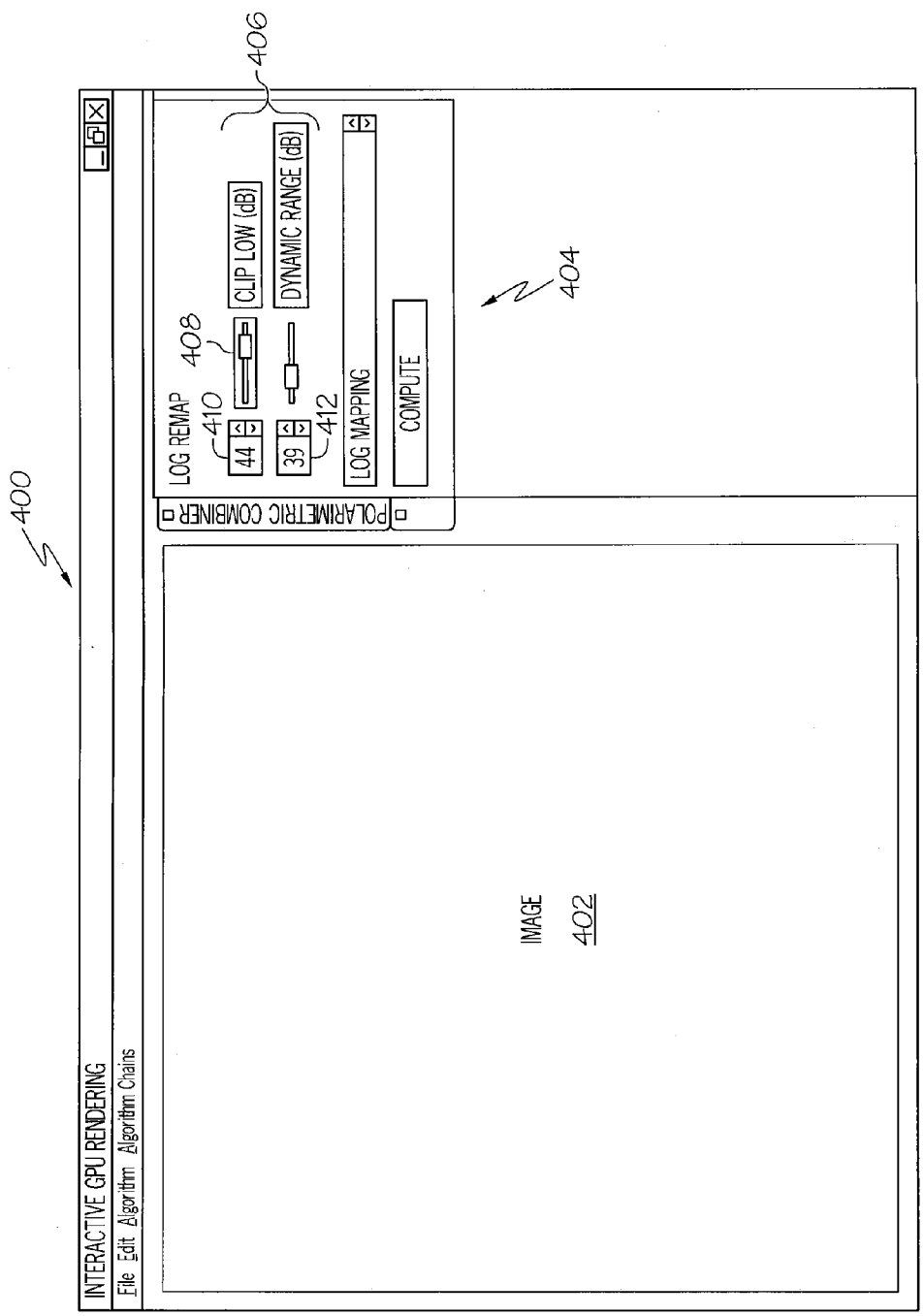
FIG. 4 is an example of another graphical user interface for processing images using SAR data on a SAR processor in accordance with an embodiment of the present disclosure.

FIG. 4 is an example of another GUI 400 for processing images using SAR data on a SAR processor in accordance with an embodiment of the present disclosure. The GUI 400 may include a section 402 for presenting or displaying an image generated by the SAR processor from the SAR data based on selected parameter values. The GUI 400 may also include a feature or mechanism 404 for selecting or adjusting the parameters 406. Examples of the parameters illustrated in the GUI 400 may include but are not necessarily limited to clip low and dynamic range. The GUI 400 may also include a slide feature 408 for adjusting each parameter 406. The GUI 400 may also include a feature 410 and 412 for selecting specific values of each parameter 406. A new image may be presented in section 402 of the GUI 400 in response to adjusting or selecting new parameter values similar to that previously described.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for generating images, comprising:
an interactive synthetic aperture radar (SAR) processor for generating an image using SAR data;
a module associated with the SAR processor for allowing a user to interactively select different settings for each of a group of parameters for generating different images by the interactive SAR processor using the SAR data, wherein the module associated with the SAR processor comprises a real-time feedback loop for adjusting the settings of the group of parameters, based on the selected settings of the group of parameters, to progressively generate images, a new image being generated in response to each adjustment of the settings of the group of parameters; and
a subaperture imaging tool to permit interactively switching between a spatial resolution and a temporal resolution.

2. The system of claim 1, further comprising a memory associated with the interactive SAR processor for storing the SAR data to substantially minimize any time delay in generating the different images.

3. The system of claim 2, wherein results from processing the SAR data by the interactive SAR processor are stored on the memory.

4. The system of claim 1, further comprising a video card, wherein the interactive SAR processor and memory storing the SAR data are both on the video card for substantially immediately generating a new image in response to a new selected setting of the group of parameters.

5. The system of claim 1, further comprising a module operable on the interactive SAR processor to only process a portion of the SAR data needed to generate the new image based on the selected settings of the group of parameters.

6. The system of claim 1, further comprising a cache to cache an active region in association with the interactive SAR processor, wherein the active region corresponds to SAR data for the image currently being displayed.

7. The system of claim 6, further comprising a scroll feature, wherein the active region is shifted on a display in response to scrolling around the image being displayed, wherein changing the active region happens in a background process and appears seamless to the user.

8. The system of claim 6, further comprising refreshing the cache from SAR data stored on a main computer memory or disk as the user scrolls around the image.

9. The system of claim 1, wherein the interactive SAR processor comprises a Graphical Processing Unit (GPU) processor.

10. The system of claim 9, further comprising:
a video card, the GPU processor being disposed on the video card;
a buffer on the video card to permit direct memory access to the on-card buffer for reprocessing a chosen image with new selected settings for the group of parameters and to re-render a resulting image to a display.

11. The system of claim 1, further comprising a polarimetric data visualizer to permit synthesis of arbitrary polarization combinations from satellite image data.

12. The system of claim 1, further comprising a shadow focusing tool to highlight shadows from vertical obstructions.

13. The system of claim 1, further comprising:
a polarimetric data visualizer to permit synthesis of arbitrary polarization combinations from satellite image data; and
a shadow focusing tool to highlight shadows from vertical obstructions.

14. A system for generating images, comprising:
an interactive SAR processor for generating an image using SAR data;
a module associated with the SAR processor for allowing a user to interactively select different settings for each of a group of parameters for generating different images by the interactive SAR processor using the SAR data;
a subaperture imaging tool to permit interactively switching between a spatial resolution and a temporal resolution;
a focusing application to permit adjustment of the focus of the image;
a polarimetric data visualizer to permit synthesis of arbitrary polarization combinations from satellite image data; and
a shadow focusing tool to highlight shadows from vertical obstructions.

15. A method for generating images, comprising:
receiving SAR data by an interactive SAR processor;
allowing a user to interactively select different settings for each of a group of parameters in a real-time feedback loop for generating different images using the SAR data;
generating an image by the interactive SAR processor from the SAR data based on the selected settings of the group of parameters;
displaying the image on a display; and
adjusting the settings of the group of parameters, based on the selected settings of the group of parameters, to progressively generate images, a new image being generated in response to the user interactively selecting different settings of the group of parameters in the real-time feedback loop; and
providing a subaperture imaging tool to permit interactively switching between a spatial resolution and a temporal resolution.

16. The method of claim 15, further comprising storing the SAR data in a memory on a video card with the interactive SAR processor for substantially immediately generating a new image by the interactive SAR processor in response to a new selected setting of the group of parameters.

17. The method of claim 15, further comprising storing resulting data from processing the SAR data to generate the image, wherein the resulting data is stored in association with the SAR processor to substantially minimize a time delay in generating a new image based on a new selected setting of the group of parameters.

18. The method of claim 17, wherein storing the resulting data comprises storing the resulting data on a video card comprising the interactive SAR processor.

19. The method of claim 15, wherein allowing the user to interactively select different settings for the group of parameters comprises providing a feature for adjusting the parameters in the real-time feedback loop.

20. A video card, comprising:
an interactive SAR processor for generating an image using SAR data based on selected values for a group of processing parameters, wherein the interactive SAR processor comprises a real-time feedback loop for adjusting the processing parameters to progressively generate images, a new image being generated in response to each new group of adjusted processing parameters, and wherein the SAR processor is adapted to provide a subaperture imaging tool to permit interactively switching between a spatial resolution and a temporal resolution; and
a memory on the video card with the interactive SAR processor to store the SAR data to substantially minimize a time delay in generating the image.

21. The video card of claim 20, wherein the SAR processor is adapted to provide a feature for adjusting the processing parameters in the real-time feedback loop.

22. The video card of claim 20, further comprising a caching scheme to cache SAR data for a current image and to refresh a cache from data stored in another data storage device in response to a user scrolling around the current image.

23. A computer program product for generating images, the computer program product comprising:
a computer readable storage medium having computer readable program code embodied therewith, the computer readable program code comprising:
computer readable program code configured to allow a user to interactively select different settings for each of a group of parameters in a real-time feedback loop for generating different images using SAR data;
computer readable program code configured to generate an image from the SAR data based on the selected settings of the group of parameters;
computer readable program code configured to display the image; and
computer readable program code to adjust the settings of the group of parameters, based on the selected settings of the group of parameters, to progressively generate images, a new image being generated in response to the user interactively selecting different settings of the group of parameters in the real-time feedback loop; and
computer readable program code configured to provide a subaperture imaging tool to permit interactively switching between a spatial resolution and a temporal resolution.

* * * * *